(12) United States Patent
Koziel et al.

(10) Patent No.: US 11,165,578 B1
(45) Date of Patent: Nov. 2, 2021

(54) EFFICIENT ARCHITECTURE AND METHOD FOR ARITHMETIC COMPUTATIONS IN POST-QUANTUM CRYPTOGRAPHY

(71) Applicant: PQSecure Technologies, LLC, Boca Raton, FL (US)

(72) Inventors: Brian C. Koziel, Plano, TX (US); Brandon Langenberg, Boca Raton, FL (US)

(73) Assignee: PQSecure Technologies, LLC, Boca Raton, FL (US)

( * ) Notice: Subject to any disclaimer, the term of this patent is extended or adjusted under 35 U.S.C. 154(b) by 0 days.

(21) Appl. No.: 17/253,608

(22) PCT Filed: Aug. 16, 2018

(86) PCT No.: PCT/US2018/046825
§ 371 (c)(1),
(2) Date: Dec. 17, 2020

(87) PCT Pub. No.: WO2020/036598
PCT Pub. Date: Feb. 20, 2020

(51) Int. Cl.
*H04L 9/30* (2006.01)
*H04L 9/08* (2006.01)
*G06F 7/72* (2006.01)

(52) U.S. Cl.
CPC ............ *H04L 9/3073* (2013.01); *G06F 7/726* (2013.01); *H04L 9/0852* (2013.01)

(58) Field of Classification Search
CPC .............................. G06F 7/726; H04L 9/3073
See application file for complete search history.

(56) References Cited

U.S. PATENT DOCUMENTS

| 7,240,204 | B1* | 7/2007 | Koc | ........................ | G06F 7/724 |
| | | | | | 708/492 |
| 2003/0135530 | A1 | 7/2003 | Parthasarathy | | |
| 2004/0078407 | A1* | 4/2004 | Naslund | .................. | G06F 7/724 |
| | | | | | 708/492 |
| 2005/0160316 | A1 | 7/2005 | Shipton | | |
| 2006/0072743 | A1* | 4/2006 | Naslund | ................ | H04L 9/3066 |
| | | | | | 380/28 |
| 2006/0195769 | A1 | 8/2006 | Hassner | | |
| 2013/0326315 | A1 | 12/2013 | Elia et al. | | |
| 2014/0369492 | A1* | 12/2014 | Lambert | ................. | G06F 7/725 |
| | | | | | 380/28 |

* cited by examiner

*Primary Examiner* — Michael D. Yaary
(74) *Attorney, Agent, or Firm* — Mark C. Johnson; Johnson Dalal (57) ABSTRACT

A computer processing system for reducing a processing footprint in cryptosystems utilizing quadratic extension field arithmetic such as pairing-based cryptography, elliptic curve cryptography, code-based cryptography and post-quantum elliptic curve cryptography that includes at least one computer processor having a register file with three processor registers operably configured to implement quadratic extension field arithmetic equations in a finite field of $F_p{}^2$ and a multiplexer operably configured to selectively shift from each of the three processor registers in sequential order to generate modular additional results and modular multiplication results from the three processor registers.

7 Claims, 3 Drawing Sheets

EFFICIENT ARCHITECTURE AND METHOD FOR ARITHMETIC COMPUTATIONS IN POST-QUANTUM CRYPTOGRAPHY

FIELD OF THE INVENTION

The present invention relates generally to systems and methods directed toward post-quantum cryptosystems, and, more particularly, relates to cryptosystems utilizing quadratic extension field arithmetic such as pairing-based cryptography, elliptic curve cryptography, code-based cryptography and post-quantum elliptic curve cryptography.

BACKGROUND OF THE INVENTION

Cryptology is the practice and study of techniques for secure communication in the presence of third parties called adversaries. More generally, cryptography is about constructing and analyzing protocols that prevent third parties or the public from reading private messages and includes various aspects in information security such as data confidentiality, data integrity, authentication, and non-repudiation. Applications of cryptography include electronic commerce, chip-based payment cards, digital currencies, computer passwords, and military communications. Cryptosystems are a suite of cryptographic algorithms needed to implement a particular security service, most commonly for achieving confidentiality. Due to the typical amount and time of computations required for a cryptography session, namely one utilizing post-quantum cryptography, the hardware or processing footprint is quite expansive. As such, utilizing such methods and systems is made impossible or commercially impracticable when desired for use in smaller devices, such as IoT devices.

Therefore, those known systems and methods fail to address small implementations of post-quantum cryptosystems, particularly those which utilize quadratic extension field arithmetic. As these cryptosystems have only just been gaining popularity and acceptance in the cryptographic community, implementations of arithmetic computations for cryptosystems have also made its deployment problematic. More specifically, the primary deficiency with post-quantum cryptosystems has typically been their efficiency. As such, much of the research community has focused on making high-speed implementations. These efforts, however, have resulted in the creation of systems generating large processing footprints that are often inefficient.

In addition, the naive way to implement quadratic extension field arithmetic is to use a random-access register file with a modular addition and multiplication unit. As discussed above, however, these configurations are spatially inefficient and not commercially practicable when smaller devices are the targeted implementation environment. As such, there are no known lightweight implementations of elliptic curve or post-quantum cryptography. Some known hardware implementations target very high performance with very large register files and replicated arithmetic units. Other known implementations of finite-field arithmetic that attempt to target a small processing footprint environment are not versatile and still commercially impracticable in that they utilize binary fields and elliptic curve cryptography.

Therefore, a need exists to overcome the problems with the prior art as discussed above.

SUMMARY OF THE INVENTION

The invention provides a system and method for reducing the processing footprint in cryptosystems utilizing quadratic extension field arithmetic that overcomes the hereinbefore-mentioned disadvantages of the heretofore-known devices and methods of this general type and that creates a cryptosystem utilizing quadratic extension field arithmetic implemented with a protocol having a much smaller processing footprint. Specifically, one embodiment of the present invention implements a circular-access register file with three registers operably configured to implement all necessary quadratic extension field arithmetic. The present invention is also directed toward a small accelerator for quadratic extension field arithmetic, or arithmetic in $F_p^2$. The goal of this architecture is to perform these arithmetic operations with as small processing area as possible. By reducing the processing area, the system and process achieves a much smaller resource footprint as well as reduce the necessary power and energy for computing various cryptographic primitives. Additionally, the present invention includes a system and method beneficially operably configured to (1) perform quadratic extension field addition, multiplication, squaring, and inversion in a constrained environment; (2) minimize the number of registers needed to hold intermediate values; (3) minimize the register complexity; (4) minimize the number of arithmetic operations required for extension field arithmetic; and (5) select small arithmetic units to perform extension field arithmetic.

With the foregoing and other objects in view, there is provided, in accordance with the invention, a computer processing system for reducing a processing footprint in cryptosystems utilizing quadratic extension field arithmetic having at least one computer processor with a register file including three processor registers operably configured to implement quadratic extension field arithmetic equations in a finite field of $F_p^2$ and a multiplexer operably configured to selectively shift from each of the three processor registers in sequential order to generate modular addition results and modular multiplication results from the three processor registers.

In accordance with a further feature of the present invention, the register file is of a circular-access register file block.

In accordance with another feature, an embodiment of the present invention includes the three processor registers consisting essentially of a first work processor register, a second work processor register, and an accumulator register.

In accordance with another feature, an embodiment of the present invention includes a digit-serial adder unit operably coupled to the first work processor register and a constant prime number for which the finite field of $F_p^2$ is defined and a modular multiplication unit operably coupled to the second work processor register and the constant prime number for which the finite field of $F_p^2$ is defined.

In accordance with a further feature of the present invention, wherein the digit-serial adder unit and modular multiplication unit are single units.

In accordance with yet another feature of the present invention, the quadratic extension field arithmetic equations have an irreducible polynomial of $i^2+1$. That is, the finite field of $F_p^2$ is defined as $F_p[i]/(i^2+1)$. Or in other words, the polynomial field in i, modulo the irreducible polynomial $i^2+1$ yields a finite field containing $p^2$ elements, namely $F_p^2$.

In accordance with another feature, an embodiment of the present invention includes the register file having five processor registers operably configured to implement quadratic extension field arithmetic equations in a finite field of $F_p^2$, wherein the five processor registers consist essentially of a first work processor register, a second work processor register, a third work processor register, a first accumulator register, and a second accumulator register.

In accordance with the present invention, a method for reducing a processing footprint in cryptosystems utilizing quadratic extension field arithmetic comprising the steps of providing at least one computer processor having a register file with a first work processor register, a second work processor register, and an accumulator register and initiating, through the least one computer processor, a cryptography session. The cryptography session includes selecting a constant prime number p for which a finite field of $F_p^2$ is defined, receiving numerical data into the first and second work processor registers sequentially and executing quadratic extension field arithmetic equations in the finite field of $F_p^2$ using the numerical data to generate arithmetic results from each of the first and second work processor registers, receiving the arithmetic results into the accumulator register and providing the arithmetic results from the accumulator register to the first work processor register to define a circular-access register file block, and outputting the arithmetic results through the first work processor register.

In accordance with another feature, an embodiment of the present invention also includes receiving numerical data into the first and second work processor registers sequentially through a one-way data flow.

In accordance with yet another feature, an embodiment of the present invention includes the cryptography session also having the steps of sequentially shifting from first and second work processor registers and the accumulator register through a multiplexer and choosing a quadratic extension field with an irreducible polynomial of $i^2+1$ after the constant prime number p has been defined.

Although the invention is illustrated and described herein as embodied in a system and method for reducing the processing footprint in post-quantum cryptosystems, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of any processing chip. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient system and method for reducing the processing footprint of arithmetic computations for cryptosystems. More specifically, the system and method is directed toward a cryptosystem having a lightweight accelerator for arithmetic operations in $F_p^2$ (hereinafter "$F_p^2$ accelerator") containing $p^2$ elements, wherein "p" is a prime number, preferably a constant prime number for which $F_p^2$ field is defined. The system is lightweight in that it is structurally and operably configured to minimize the number of processor registers, namely intermediate registers, uses a circular work register block, and includes a digit-serial adder and modular multiplier. Specifically, the system is configured with hardware and instructions to target prime fields where extension field arithmetic can be defined over an irreducible polynomial $i^2+1$, wherein this characteristic is specifically targeted to design the $F_p^2$ accelerator.

Figure 1:
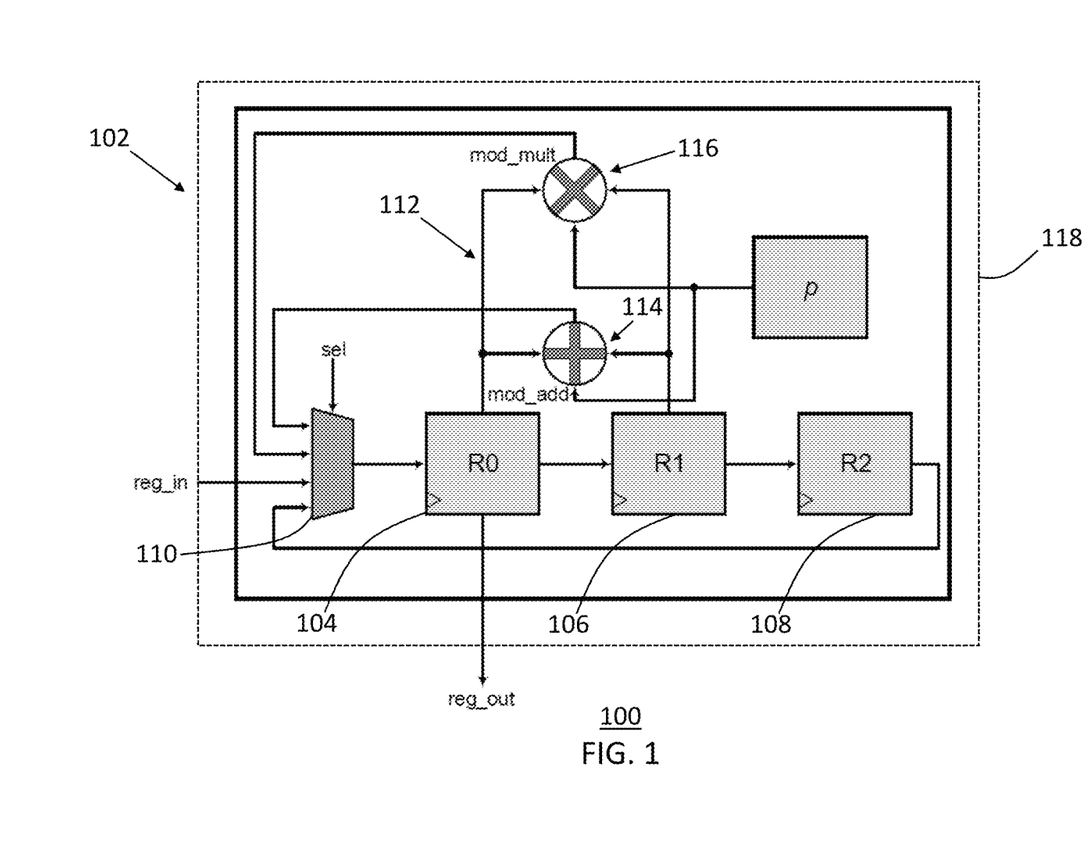
FIG. 1 is a schematic diagram depicting an $F_p^2$ accelerator utilizing three processor registers in accordance with an embodiment of the present invention.

One embodiment of the present invention is shown schematically through a block diagram in FIG. 1. FIG. 1, along with other figures herein, show several advantageous features of the present invention, but, as will be described below, the invention can be provided in several shapes, sizes, combinations of features and components, and varying numbers and functions of the components. The first example of an $F_p^2$ accelerator architecture 100 utilized in the aforementioned system and method, as shown in FIG. 1 and with reference to FIG. 3, includes a register file 102 having three processor registers 104, 106, 108 operably configured to implement quadratic extension field arithmetic equations in a finite field of $F_p^2$ and a multiplexer select 110 operably configured to selectively shift from each of the three processor registers 104, 106, 108 in sequential order. The register file 102 is resident, housed on, and/or operably connected to at least one computer processor (represented schematically as element 118 in FIG. 1). Each of the three processor registers 104, 106, 108 may also be referred to or defined as the first work processor register R0, the second work processor register R1, and an accumulator register R2, respectively.

As those of skill in the art will appreciate, a register file is an array of processor registers in a central processing unit (CPU). In one embodiment, the processor registers 104, 106, 108 are circuit-based register files and may be implemented by way of fast static random access memories (RAMs) with multiple ports. Such RAMs are distinguished by having dedicated read and write ports, whereas ordinary multiported RAMs will usually read and write through the same ports. In other embodiments, the processor registers 104, 106, 108 may be implemented by way of fast dynamic RAMs. The instruction set architecture of a CPU will almost always define a set of registers which are used to stage data between memory and the functional units on the chip. In simpler CPUs, these architectural registers correspond one-for-one to the entries in a physical register file (PRF) within the CPU. More complicated CPUs use register renaming, so that the mapping of which physical entry stores a particular architectural register changes dynamically during execution.

Figure 2:
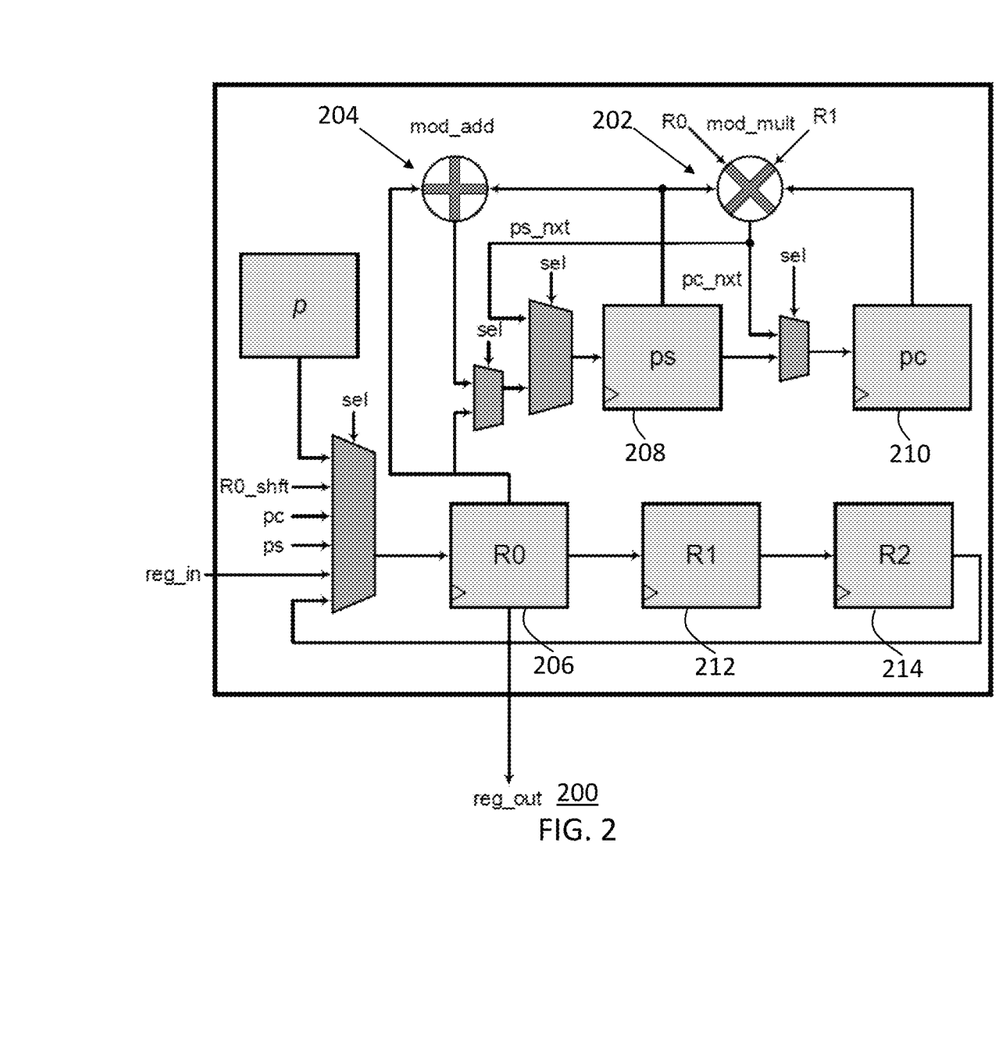
FIG. 2 is a schematic diagram depicting an $F_p^2$ accelerator with instantiated addition and multiplication units utilizing three processor registers in accordance with an embodiment of the present invention.
Figure 3:
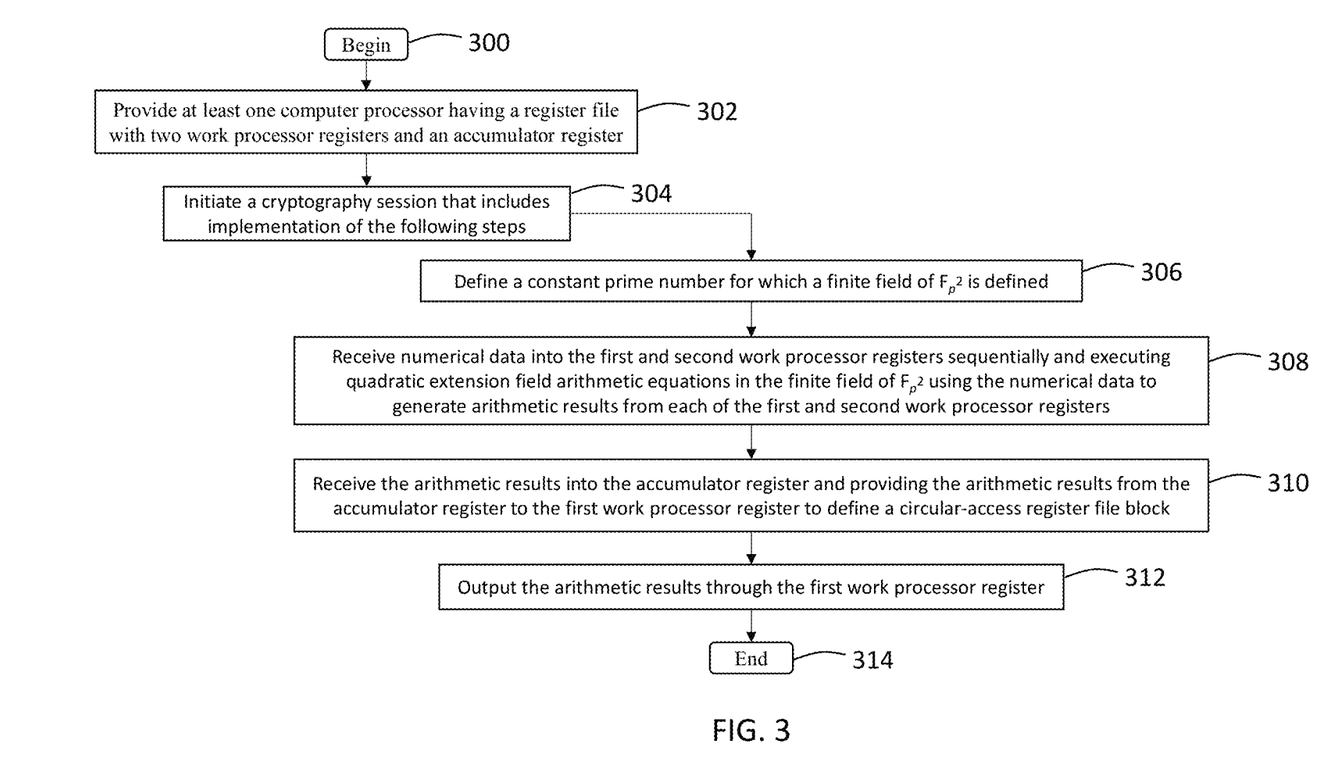
FIG. 3 is a process flow diagram depicting a computer-implemented method for reducing a processing footprint of arithmetic computations for cryptosystems in accordance with one embodiment of the present invention.

FIGS. 1 and 2 will be described in conjunction with the process flow chart of FIG. 3. Although FIG. 3 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 3 for the sake of brevity. In some embodiments, some or all of the process steps included in FIG. 3 can be combined into a single process.

In the embodiment shown in FIG. 1, the $F_p^2$ accelerator utilizes the first and second work registers 104, 106 and the accumulator register 108 to perform all $F_p^2$ operations. The process may start at step 300 and immediately proceed to step 302, which includes providing the structural hardware utilized to implement the process as described herein, e.g., at least one computer processor having a register file 102 with a first work processor register 104, a second work processor register 106, and an accumulator register 108. Next, step 304 may include initiating, through the least one computer processor 118, a cryptography session. Said another way, a circular register file array 102 may be used to move data between registers 104, 106, 108 in one direction, i.e., through a one-way data flow. All data may flow in and out through work register R0.

More specifically, the cryptography session may include step 306 defining a constant prime number, p, for which a finite field of $F_p^2$ is defined. The prime number p may be predefined or dynamically and selectively defined by the user and/or the processor. Next, step 308 may include receiving numerical data into the first and second work processor registers 104, 106 sequentially and executing quadratic extension field arithmetic equations (represented schematically in FIG. 1 as arrow 112) in the finite field of $F_p^2$ using the numerical data to generate arithmetic results from each of the first and second work processor registers 104, 106. The multiplexer select or "sel" 110 on the left side of the block diagram may be utilized to select and save from new modular addition results 114 (depicted as "mod_add" in FIG. 1) and modular multiplication results 116 (depicted as "mod_mult" in FIG. 1) generated from each respective work processor register 104, 106. The multiplexer 110 is also operably configured to cause register shifts from register R2, 108 to register 104. As such, a circular-access register file is created, whereby the three registers 104, 106, 108 are operably configured to implement all necessary quadratic extension field arithmetic. This circular access reduces the quadratic complexity of register multiplexers to a constant cost, thus reducing processing area in exchange for some control logic.

As those of skill in the art will appreciate, the multiplexer 110 is a device that selects one of several analog or digital input signals and forwards the selected input into a single line. A multiplexer of $2^n$ inputs has n select lines, which are used to select which input line to send the output. A multiplexer can also be used to implement Boolean functions of multiple variables.

The system may also include a digit-serial adder unit 114 operably coupled to the first work processor register 104 and a constant prime number p (depicted in FIG. 1) for which the finite field of $F_p^2$ is defined. The system may also include a modular multiplication unit 116 operably coupled to the second work processor register 106 and the constant prime number p for which the finite field of $F_p^2$ is defined. The digit-serial adder unit 114 and modular multiplication unit 116 may also be single units.

The quadratic extension field arithmetic equations operably configured to be carried out by the $F_p^2$ accelerator can include modular addition, subtraction, squaring, multiplication, and inversion in the finite field $F_p^2$. More specifically, elements in $F_p^2$ are represented in the form of $A=a_0+ia_1$, wherein i is a non-quadratic residue and $a_0$ and $a_1$ are elements of $F_p$. When the irreducible polynomial is selected as $i^2+1$, where $i=\sqrt{-1}$ in $F_p^2$, certain finite field operations can be defined in $F_p^2$ with specific formulas involving $F_p^2$ operations:

$$A+B=a_0+b_0+i(a_1+b_1)$$

$$A-B=a_0-b_0+i(a_1-b_1)$$

$$A\times B=(a_0+a_1)(b_0-b_1)+a_0b_1-a_1b_0+i(a_0b_1+a_1b_0)$$

$$A^2=(a_0+a_1)(a_0-a_1)+i2a_0a_1$$

$$A^{-1}=a_0(a_0^2+a_1^2)^{-1}-ia_1(a_0^2+a_1^2)^{-1}$$

Thus, an addition and subtraction require 2 $F_p$ additions, a multiplication requires 3 $F_p$ multiplications and 5 $F_p$ additions, a squaring requires 2 $F_p$ multiplications and 3 $F_p$ additions, and an inversion requires 1 $F_p$ inversion, 2 $F_p$ multiplications, 2 $F_p$ squarings, and 2 $F_p$ additions. Table 1, below, exemplifies the $F_p^2$ accelerator carrying out $F_p^2$ squaring. More specifically, assume that we are squaring the value $A=a_0+ia_1$ to get $A^2=(a_0+a_1)(a_0-a_1)+i2a_0a_1$. This architecture uses an accumulate-based approach. It is also assumed the file register is of a circular register buffer in the order register $R_0$ to $R_1$ to $R_2$ to $R_0$ and that $R_0$ and $R_1$ are work registers. Therefore, $A^2$ and $A\times B$ with the controls shown in Tables 1-2, respectively. Said another way, one register, e.g., register 108 is temporary to accumulate the intermediate results and perform operations sequentially in the work registers, e.g., registers 104, 106.

TABLE 1

| Control | $R_0$ | $R_1$ | $R_2$ |
| --- | --- | --- | --- |
| Load $a_0$ | $a_0$ | | |
| Load $a_1$ | $a_1$ | $a_0$ | |
| Add | $a_0 + a_1$ | $a_0$ | |
| Load $a_1$ | $a_1$ | $a_0 + a_1$ | $a_0$ |
| Shift | $a_0$ | $a_1$ | $a_0 + a_1$ |
| Subtract | $a_0 - a_1$ | $a_1$ | $a_0 + a_1$ |
| Shift | $a_0 + a_1$ | $a_0 - a_1$ | $a_1$ |
| Multiply | $(a_0 + a_1)(a_0 - a_1)$ | $a_0 - a_1$ | $a_1$ |
| Store $R_0$ | $(a_0 + a_1)(a_0 - a_1)$ | $a_0 - a_1$ | $a_1$ |
| Shift | $a_1$ | $(a_0 + a_1)(a_0 - a_1)$ | $a_0 - a_1$ |
| Load $a_0$ | $a_0$ | $a_1$ | $(a_0 + a_1)(a_0 - a_1)$ |
| Multiply | $a_0a_1$ | $a_1$ | $(a_0 + a_1)(a_0 - a_1)$ |
| Copy $R_0$ | $a_0a_1$ | $a_0a_1$ | $a_1$ |
| Add | $2a_0a_1$ | $a_0a_1$ | $a_1$ |
| Store $R_0$ | $2a_0a_1$ | $a_0a_1$ | $a_1$ |

Table 2, below, exemplifies the $F_p^2$ accelerator carrying out $F_p^2$ multiplication.

TABLE 2

| Control | $R_0$ | $R_1$ | $R_2$ |
| --- | --- | --- | --- |
| Load $a_0$ | a0 | | |
| Load $a_1$ | $a_1$ | $a_0$ | |
| Add | $a_0 + a_1$ | $a_0$ | |
| Load $b_0$ | $b_0$ | $a_0 + a_1$ | $a_0$ |
| Load $b_1$ | $b_1$ | $b_0$ | $a_0 + a_1$ |
| Subtract | $b_0 - b_1$ | $b_0$ | $a_0 + a_1$ |
| Shift | $a_0 + a_1$ | $b_0 - b_1$ | $b_0$ |
| Multiply | $t = (a_0 + a_1)(b_0 - b_1)$ | $b_0 - b_1$ | $b_0$ |
| Store $R_0$ | $t$ | $b_0 - b_1$ | $b_0$ |
| Load $a_1$ | $a_1$ | $t$ | $b_0 - b_1$ |
| Load $b_0$ | $b_0$ | $a_1$ | $t$ |
| Multiply | $a_1b_0$ | $a_1$ | $t$ |
| Store $R_0$ at $b_0$ | $a_1b_0$ | $a_1$ | $t$ |
| Shift | $t$ | $a_1b_0$ | $a_1$ |
| Subtract | $t - a_1b_0$ | $a_1b_0$ | $a_1$ |
| Load $a_0$ | $a_0$ | $t - a_1b_0$ | $a_1b_0$ |
| Load $b_1$ | $b_1$ | $a_0$ | $t - a_1b_0$ |

TABLE 2-continued

| Control | $R_0$ | $R_1$ | $R_2$ |
| --- | --- | --- | --- |
| Multiply | $a_0b_1$ | $a_0$ | $t - a_1b_0$ |
| Shift | $t - a_1b_0$ | $a_0b_1$ | $a_0$ |
| Add | $t + a_0b_1 - a_1b_0$ | $a_0b_1$ | $a_0$ |
| Store $R_0$ | $t + a_0b_1 - a_1b_0$ | $a_0b_1$ | $a_0$ |
| Load $a_1b_0$ | $a_1b_0$ | $t + a_0b_1 - a_1b_0$ | $a_0b_1$ |
| Shift | $a_1b_0$ | $a_1b_0$ | $t + a_0b_1 - a_1b_0$ |
| Add | $a_0b_1 + a_1b_0$ | $a_1b_0$ | $t + a_0b_1 - a_1b_0$ |
| Store $R_0$ | $a_0b_1 + a_1b_0$ | $a_1b_0$ | $t + a_0b_1 - a_1b_0$ |

Table 3, below, depicts operation complexities for $F_p^2$ arithmetic as compared to known prior art. Specifically, the system and method of the present invention utilizes these multiplication and squaring formulas to minimize their arithmetic complexity. As those of skill in the art will appreciate, $F_p$ multiplication is much more arithmetically intensive than $F_p$ addition.

TABLE 3

| | $F_p$ Operation | | |
| --- | --- | --- | --- |
| $F_p^2$ Operation | Add (A) | Multiplication (M) | Inversion (I) |
| Addition (A) | 2 | 0 | 0 |
| Multiplication (M) (Prior Art) | 2 | 4 | 0 |
| Multiplication (M) ($F_p^2$ Accelerator) | 5 | 3 | 0 |
| Squaring (S) (Prior Art) | 2 | 3 | 0 |
| Squaring (S) ($F_p^2$ Accelerator) | 3 | 2 | 0 |
| Inversion (I) | 2 | 4 | 1 |

One benefit to the architecture depicted in FIG. 1 is that each $F_p^2$ operation will always require the same sequence of instructions in the same amount of time, thus providing resistance to some timing and power side channel attacks. Although many cryptographic primitives are strong in black-box models of algorithms, physical implementations of these algorithms will inadvertently leak other information, such as timing, power, or electromagnetic residues. When cryptographic primitives are implemented naively, these side channels can be analyzed to recover critical information, such as a party's secret key(s). Therefore, to help protect against such attacks, this architecture forces constant-time and a constant set of operations for each $F_p^2$ and $F_p$ computation. Advantages in this architecture include minimizing the number of intermediate registers for $F_p^2$ operations, the number of work registers, the number of $F_p$ operations, and the multiplexer interaction of these three registers with the register file. Each of these characteristics correspond to reduced processing area with only a small impact on the timing. As Table 3, above, demonstrates, one $F_p$ multiplication is exchanged for three $F_p$ additions in $F_p^2$ multiplication and one $F_p$ addition in $F_p^2$ squaring, which generally reduces the latency of these operations. Assuming that each load, store, and shift only requires a single cycle, the control style of computations also greatly reduces the processing area cost of implementing the $F_p^2$ operations for a small latency overhead. For a lightweight ASIC, minimizing the processing area and size is key to creating a small co-processor for cryptographic applications.

Therefore, to minimize the register footprint, the present inventions preferably utilizes two work registers 104, 106 and an accumulator register 108, which is sufficient for all necessary $F_p^2$ operations. The number of arithmetic operations needed is then minimized by choosing a quadratic extension field with the irreducible polynomial $i^2+1$. In the resulting architecture, digit-serial addition and modular multiplication units 114, 116 may also be utilized to perform the necessary prime field arithmetic in series, using circular register shifts and loads, implemented through the multiplexer as needed.

Beneficially, some principal applications of the present invention may include reducing the processing area overhead (i.e., the number of gates in a digital circuit) to perform $F_p^2$ arithmetic. As such, features such as providing a circular register file, an accumulator-based flow with minimum register complexity, the choice of special form for primes in quadratic extension fields, and small digit-serial arithmetic units to create a separated $F_p^2$ arithmetic unit generates the advantageous small processing footprint in hardware. Another goal or target of the aforementioned system and method is in post-quantum cryptography use, which also translates to uses in elliptic curve cryptography. Other applications include pairing-based cryptography, elliptic curves with isomorphisms (such as 4Q), code-based cryptography, and lattices. With reference now to FIG. 2, another example of an $F_p^2$ accelerator architecture 200 utilized in the aforementioned system and method is depicted. FIG. 2 depicts many of the same components and features references above with respect to FIG. 1. However, the $F_p^2$ accelerator 200 is instantiated and includes a bit-parallel modular multiplier unit 202 and a digit-serial adder/subtractor 204 unit. The instantiated $F_p^2$ accelerator, however, uses three work registers 206, 208, 210, for the bit-parallel modular multiplier and two accumulators 212, 214 to perform $F_p^2$ addition, multiplication, squaring, and inversion. Said another way, whether implemented into the $F_p^2$ accelerator embodiments of FIG. 1 or 2, step 310 of the method may include receiving the arithmetic results, during the cryptography session, into one or more accumulator registers and providing the arithmetic results from one or more accumulator registers to the first work processor register to define a circular-access register file block. As seen below, step 312 may include outputting the arithmetic results through the first work processor register for use by the processor 118 and/or memory operably connected thereto. The process may terminate in step 314.

More specifically, the $F_p^2$ accelerator architecture 200 utilizes the bit-parallel modular multiplier 202 and a digit-serial adder 204 with a 32-bit adder/subtractor. In this embodiment, two additional work registers 208, 210 (also depicted in FIG. 2 as ps and pc) are utilized and they hold intermediate carry/save adder values for, by way of example, a Montgomery modular multiplication algorithm utilized in the multiplier unit 202. Additionally, register 212 (also depicted as R1) is no longer used for addition and subtraction; rather, register 208 performs addition and subtraction through use of the unit 204. A complexity analysis for the $F_p^2$ accelerator depicted in FIG. 2 is shown in Table 4, below. Specifically, the instantiated $F_p^2$ complexity (disregards control signals) with a bit-parallel multiplier and digit-serial (d=32) adder. FF=Flip-Flop, FA=Full Adder. For the final row, m is the number of bits in the prime for the quadratic field. There are also 3 half adders and 3 XOR gates in these results.

TABLE 4

| Prime | #FF | #FA | #AND | #NOT | #2:1MUX |
|---|---|---|---|---|---|
| $P_{434}$ $2^{216}3^{137}-1$ | 2200 | 900 | 871 | 32 | 5706 |

TABLE 4-continued

| Prime | #FF | #FA | #AND | #NOT | #2:1MUX |
|---|---|---|---|---|---|
| $P_{503}$ $2^{250}3^{159}-1$ | 2535 | 1038 | 1009 | 32 | 6603 |
| $P_{546}$ $2^{273}3^{177}-1$ | 2792 | 1124 | 1095 | 32 | 7162 |
| $P_{752}$ $2^{372}3^{239}-1$ | 3791 | 1534 | 1505 | 32 | 9827 |
| $P_{960}$ $2^{486}3^{301}-1$ | 4866 | 1952 | 1923 | 32 | 12544 |
| $P_m$ | 5m + 2 + 2 (d − m % d) | 2m + d | 2m + 3 | d | 13m + 2d |

Table 5, below, depicts implementation results of instantiated $F_p^2$ accelerator on Artix-7 FPGA.

TABLE 5

| | Area | | Latency (clock cycles) | | | |
|---|---|---|---|---|---|---|
| Prime | #FFs | #LUTs | $F_p$ add | $F_p$ mult. | $F_p^2$ add | $F_p^2$ mult. |
| $p_{434}$ | 2,233 | 2,618 | 47 | 470 | 94 | 1,645 |
| $p_{503}$ | 2,583 | 3,059 | 53 | 543 | 106 | 1,894 |
| $p_{751}$ | 3,837 | 4,459 | 77 | 807 | 154 | 2,806 |

The primary source of gates come from the bit-parallel multiplier and there are also many 2:1 multiplexers as a result of interfacing between the registers for various operations. As reflected in Table 5, above, the efficacy of the $F_p^2$ architecture in an Artix-7 FPGA can be seen. This implementation, however, did not include additional control signals, which would constitute an extremely small additional area overhead. The processing area and time complexities are also shown in Table 5 and it can be seen that the $F_p^2$ time complexity uses the operation counts in Table 3. The critical path is the digit-serial adder, which was a 32-bit adder in this case. When discussing the complexity of this instantiated $F_p^2$ accelerator, it is important to note the naive approach. From Table 5, again, it becomes readily apparent that performing extra multiplications becomes very costly.

Thus, by using the formulas we provide for $F_p^2$ operations, the aforementioned system and method are saving many cycles by replacing a modular multiplication with a few modular additions or subtractions. In Table 6, below, a timing comparison between the present invention's $F_p^2$ multiplication and squaring formulas versus naive formulas are shown. It can be seen that $F_p^2$ multiplication is approximately 20% faster and $F_p^2$ squaring is 30% faster when compared to naive formulas. However, the choice of modular multiplier and modular adder were combined in three work registers. This adds additional multiplexers for interfacing logic, but also reduces multiplexers that would be used to initialize these registers. The logical flow of the registers in the circular buffer eliminates the need for excess 2:1 multiplexers.

TABLE 6

| | Latency (clock cycles) | | | |
|---|---|---|---|---|
| | Naïve Arithmetic | | $F_p^2$ Arithmetic | |
| Prime | $F_p^2$ multiplication | $F_p^2$ squaring | $F_p^2$ multiplication | $F_p^2$ squaring |
| $P_{434}$ | 1,974 | 1,504 | 1,645 | 1,081 |
| $P_{503}$ | 2,278 | 1,735 | 1,894 | 1,245 |
| $P_{751}$ | 3,382 | 2,575 | 2,806 | 1,845 |

Table 7, below, depicts the $F_p^2$ accelerator performing addition operations.

TABLE 7

| Control | $R_0$ | ps | carry |
|---|---|---|---|
| Initial conditions | 70 | 45 | 0 |
| Initial conditions in binary | 8b0100_0110 | 8b0010_1101 | 0 |
| Add lowest digit and store to ps | 8b0100_0110 | 8b0010_0011 | 1 |
| Shift d bits | 8b0110_0100 | 8b0011_0010 | 1 |
| Add lowest digit with carry to ps | 8b0110_0100 | 8b0011_0111 | 0 |
| Shift d bits | 8b0100_0110 | 8b0111_0011 | 0 |
| Final result is ps | 70 | 115 | 0 |

By way of example utilizing the $F_p^2$ accelerator depicted in FIG. 2, Table 7, above, depicts said accelerator performing addition. In Table 7, p=71 and the results reflect the performance of simple addition of a=70 and b=45 to produce the result c=70+45=115. Table 7, however, illustrates the step-by-step computations with an adder digit size of d=4. This means that system and method described herein processes 4 bits of the result at a time. For this architecture, we produce the result by adding ps=$R_0$+ps over multiple cycles. We load $R_0$=a=70 and ps=b=45. Since the prime p is 7 bits and we add 4 bits at a time, we have the result after two cycles (an add and shift would be performed simultaneously, but it is specifically listed to illustrate what the hardware executes).

TABLE 8

| Control | $R_0 = x$ | $R_1 = y$ | ps = Sc | pc = Ss | q |
|---|---|---|---|---|---|
| Initialize ps and pc to zero | 13 | 5 | 0 | 0 | 0 |
| Step 0 | 13 | 5 | 0 | 0 | 1 |
| Step 1 | 13 | 5 | 33 | 5 | 0 |
| Step 2 | 13 | 5 | 19 | 0 | 0 |
| Step 3 | 13 | 5 | 10 | 2 | 1 |
| Step 4 | 13 | 5 | 39 | 5 | 0 |
| Step 5 | 13 | 5 | 20 | 2 | 0 |
| Step 6 | 13 | 5 | 11 | 0 | 1 |
| Final conditions | 13 | 5 | 38 | 3 | 0 |
| Final result is ps + pc = 41 | 13 | 5 | 38 | 3 | 0 |

Table 8, above, depicts an example of modular multiplication in depth. This performs a bit-parallel modular multiplier based on the Montgomery multiplication algorithm. For this, the system will calculate m smaller modular multiplications for an m-bit prime p. For p=71, we have a 7-bit prime, so we perform 7 smaller modular multiplications for the final result. The idea of a multiplier is that it is based on the carry-save adder technique, where we perform very fast additions in parallel without worrying about carry propagations. Algorithm 1, below, shows the algorithm that the multiplier follows. Table 8 shows a cycle-by-cycle breakdown of what the 7 cycles will be in Table 8. We perform the multiplication with a=13 and b=5, which when using $R=2^7$, will produce the result c=$abR^{-1}$ mod 71=41. Algorithm 1—Bit-serial CSA Montgomery multiplication. Sc and Ss refer to the carry and sum bits of the result S, respectfully. Specifically, the input may be a Modulus M, $R=2^k>M$, operands x, y<M The output may be z=$xyR^{-1}$ mod M Therefore, an exemplary software-based algorithm to effectuate the same is depicted below:

1. Sc=0,S s=0
2. for i in 0 to (k)−1 do
3. q=Sc[0]+Ss[0]+x[i]·y[0] mod 2
4. (Sc, Ss)=(Sc[i]+Ss[i]+x[i]·y+q[i]·M)/2
5. end for
6. z=Sc+Ss
7. if z≥M,thenz=z−M
8. return z=$xyR^{-1}$ mod M Table 9, below, depicts exemplary results of the $F_p^2$ accelerator generating computations and depicting what the registers hold when implementing exemplary quadratic extension field arithmetic equations in a finite field of $F_p^2$. For this example, p=71 and perform an $F_p^2$ multiplication (with irreducible polynomial $i^2$+1) between A=5+3i and B=13+9i to produce the result C. What is not shown, for brevity, are the cycle-by-cycle contents of the modular multiplier or addition, as exemplary results of these are depicted in Tables 7 and 8, respectively. The values are converted to the Montgomery form by performing the computation $a_j$R mod p and $b_j$R mod p with $R=2^7$ for j=0; 1. Thus, the inputs in the Montgomery domain are A=1+29i and B=31+16i. The final value for C=36+31i, so the normal representation of this result is C=38+13i, which can be recovered in a simple way by performing the computations C=(5×13−3×9)+(5×9+3×13)=38+13i.

TABLE 9

| Control | $R_0$ | $R_1$ | $R_2$ | ps | pc |
|---|---|---|---|---|---|
| Perform $a_0 + a_1$ mod p ($F_p$ addition), $a_0$ = 1, $a_1$ = 29 | | | | | |
| Load $a_0$ | 1 | | | | |
| Store $R_0$ to ps | 1 | | | 1 | |
| Load $a_1$ | 29 | 1 | | | |
| Add | 29 | 1 | | 30 | |
| Load p | 71 | 1 | | 30 | |
| Copy ps | 71 | 1 | | 30 | 30 |
| Subtract p | 71 | 1 | | −41 | 30 |
| Store mod p res | 30 | 1 | | −41 | 30 |
| Perform $b_0 - b_1$ mod p ($F_p$ subtraction), $b_0$ = 31, $b_1$ = 16 | | | | | |
| Load $b_0$ | 31 | 30 | 1 | −41 | 30 |
| Store $R_0$ to ps | 31 | 30 | 1 | 31 | 30 |
| Load $b_1$ | 16 | 31 | 30 | 31 | 30 |
| Subtract | 16 | 31 | 30 | 15 | 30 |
| Load p | 71 | 31 | 30 | 15 | 30 |
| Copy ps | 71 | 31 | 30 | 15 | 15 |
| Add p | 71 | 31 | 30 | 86 | 15 |
| Store mod p res | 15 | 31 | 30 | 86 | 15 |
| Perform t = ($a_0 + a_1$)($b_0 - b_1$) mod p ($F_p$ multiplication) $a_0 + a_1$ = 30, $b_0 - b_1$ = 15 | | | | | |
| Shift | 30 | 15 | 31 | 86 | 15 |
| Multiply | 30 | 15 | 31 | 46 | 3 |
| Store pc | 3 | 15 | 31 | 46 | 3 |
| Add pc + ps | 3 | 15 | 31 | 49 | 3 |
| Load p | 71 | 15 | 31 | 49 | 3 |
| Copy ps | 71 | 15 | 31 | 49 | 49 |
| Sub p | 71 | 15 | 31 | −22 | 49 |
| Store mod p res | 49 | 15 | 31 | −22 | 49 |
| Perform $a_1 b_0$ mod p ($F_p$ multiplication), $a_1$ = 29, $b_0$ = 31 | | | | | |
| Load $a_1$ | 29 | 49 | 31 | −22 | 49 |
| Load $b_0$ | 31 | 29 | 49 | −22 | 49 |
| Multiply | 31 | 29 | 49 | 22 | 0 |
| Store pc | 0 | 31 | 49 | 22 | 0 |
| Add pc + ps | 0 | 31 | 49 | 22 | 0 |
| Load p | 71 | 31 | 49 | 22 | 0 |
| Copy ps | 71 | 31 | 49 | 22 | 22 |
| Sub p | 71 | 31 | 49 | −49 | 22 |
| Store mod p res | 22 | 31 | 49 | −49 | 22 |
| Store $R_0$ at $c_1$ | 22 | 31 | 49 | −49 | 22 |
| Perform u = t − $a_1 b_0$ mod p ($F_p$ subtraction), t = 49, $a_1 b_0$ = 22 | | | | | |
| Store $R_0$ to ps | 22 | 31 | 49 | 22 | 22 |
| Shift | 49 | 22 | 31 | 22 | 22 |
| Subtract | 49 | 22 | 31 | 27 | 22 |
| Load p | 71 | 22 | 31 | 27 | 22 |
| Copy ps | 71 | 22 | 31 | 27 | 27 |
| Add p | 71 | 22 | 31 | 98 | 27 |
| Store mod p res | 27 | 22 | 31 | 98 | 27 |

TABLE 9-continued

| Control | $R_0$ | $R_1$ | $R_2$ | ps | pc |
|---|---|---|---|---|---|
| Perform $a_0b_1$ mod p ($F_p$ multiplication), $a_0 = 1$, $b_1 = 16$ | | | | | |
| Load $a_0$ | 1 | 27 | 22 | 98 | 27 |
| Load $b_1$ | 16 | 1 | 27 | 98 | 27 |
| Multiply | 16 | 1 | 27 | 9 | 0 |
| Store pc | 0 | 1 | 27 | 9 | 0 |
| Add pc + ps | 0 | 1 | 27 | 9 | 0 |
| Load p | 71 | 1 | 27 | 9 | 0 |
| Copy ps | 71 | 1 | 27 | 9 | 9 |
| Sub p | 71 | 1 | 27 | −62 | 9 |
| Store mod p res | 9 | 1 | 27 | −62 | 9 |
| Perform $c_0 = u + a_0b_1$ mod p ($F_p$ addition), $u = 27$, $a_0b_1 = 9$ | | | | | |
| Store $R_0$ to ps | 9 | 1 | 27 | 9 | 9 |
| Shift | 27 | 9 | 1 | 9 | 9 |
| Add | 27 | 9 | 1 | 36 | 9 |
| Load p | 71 | 27 | 9 | 36 | 9 |
| Copy ps | 71 | 27 | 9 | 3 | 36 |
| Subtract p | 71 | 27 | 9 | −35 | 36 |
| Store mod p res | 36 | 27 | 9 | −35 | 36 |
| Store $R_0$ at $c_0$ | 36 | 27 | 9 | −35 | 36 |
| Perform $C_1 = a_0b_1 + a_1b_0$ mod p ($F_p$ addition), $a_0b_1 = 9$, $a_1b_0 = 22$ | | | | | |
| Shift | 9 | 36 | 27 | −35 | 36 |
| Store $R_0$ to ps | 36 | 27 | 9 | 9 | 36 |
| Load $a_1b_0$ | 22 | 9 | 27 | 9 | 36 |
| Add | 22 | 9 | 27 | 31 | 36 |
| Load p | 71 | 9 | 27 | 31 | 58 |
| Copy ps | 71 | 9 | 27 | 31 | 31 |
| Subtract p | 71 | 9 | 27 | −40 | 31 |
| Store mod p res | 31 | 9 | 27 | −40 | 31 |
| Store $R_0$ at $c_1$ | 31 | 9 | 27 | −40 | 31 |

What is claimed is:

1. A computer processing system for reducing a processing footprint in cryptosystems utilizing quadratic extension field arithmetic comprising:
at least one computer processor having a register file having three processor registers operably configured to implement quadratic extension field arithmetic equations in a finite prime field of $F_p^2$ with an irreducible polynomial of $i^2+1$, where p is a prime number larger than $2^{32}$ and i is $\sqrt{-1}$ in $F_p^2$, stored and a multiplexer operably configured to selectively shift from each of the three processor registers in sequential order to generate addition and multiplication results modulo p from the three processor registers.

2. The computer processing system according to claim 1, wherein:
the register file is of a circular-access register file block.

3. The computer processing system according to claim 1, wherein three processor registers consist essentially of:
a first work processor register, a second work processor register, and an accumulator register.

4. The computer processing system according to claim 3, further comprising:
a digit-serial adder unit operably coupled to the first work processor register and a constant prime number for which the finite field of $F_p^2$ is defined; and
a modular multiplication unit operably coupled to the second work processor register and the constant prime number for which the finite field of $F_p^2$ is defined.

5. The computer processing system according to claim 4, wherein:
the digit-serial adder unit and modular multiplication unit are single units.

6. The computer processing system according to claim 1, wherein the register file further comprises:
five processor registers operably configured to implement quadratic extension field arithmetic equations in a finite field of $F_p^2$, the five processor registers consist essentially of a first work processor register, a second work processor register, a third work processor register, a first accumulator register, and a second accumulator register.

7. A computer processing system for reducing a processing footprint in cryptosystems utilizing quadratic extension field arithmetic comprising:
at least one computer processor having a register file having three processor registers operably configured to implement quadratic extension field arithmetic equations in a finite prime field of $F_p^2$ with an irreducible polynomial of $i^2+1$ that are stored and a multiplexer operably configured to selectively shift from each of the three processor registers in sequential order to generate addition and multiplication results modulo p from the three processor registers, wherein "i" is $\sqrt{-1}$ in $F_p^2$.

* * * * *